US011881175B2

(12) United States Patent
Zhou et al.

(10) Patent No.: US 11,881,175 B2
(45) Date of Patent: Jan. 23, 2024

(54) PIXEL DRIVING CIRCUIT HAVING A VOLTAGE STABILIZATION SUB-CIRCUIT AND DISPLAY PANEL THEREOF

(71) Applicant: HKC CORPORATION LIMITED, Shenzhen (CN)

(72) Inventors: Xiufeng Zhou, Shenzhen (CN); Xin Yuan, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/065,886

(22) Filed: Dec. 14, 2022

(65) Prior Publication Data

US 2023/0419907 A1 Dec. 28, 2023

(30) Foreign Application Priority Data

Jun. 28, 2022 (CN) ......................... 202210740799.2

(51) Int. Cl.
*G09G 3/3258* (2016.01)
*G09G 3/3291* (2016.01)
*G09G 3/3266* (2016.01)

(52) U.S. Cl.
CPC ......... *G09G 3/3258* (2013.01); *G09G 3/3266* (2013.01); *G09G 3/3291* (2013.01); *G09G 2300/0819* (2013.01); *G09G 2320/0233* (2013.01); *G09G 2320/045* (2013.01)

(58) Field of Classification Search
CPC .................................................... G09G 3/3258
USPC ......................................................... 345/204
See application file for complete search history.

(56) References Cited

U.S. PATENT DOCUMENTS

2020/0410937 A1* 12/2020 Chen .................... G09G 3/3233
2022/0189403 A1* 6/2022 Kang .................... G09G 3/3291

FOREIGN PATENT DOCUMENTS

CN 102074186 A 5/2011
CN 104465715 A 3/2015
CN 105654904 A 6/2016
CN 108682392 A 10/2018

* cited by examiner

*Primary Examiner* — Long D Pham
(74) *Attorney, Agent, or Firm* — Maier & Maier, PLLC

(57) ABSTRACT

A pixel driving circuit, a display panel, and a display device. The pixel driving circuit includes a driving transistor, a data-writing sub-circuit; and a voltage stabilization sub-circuit. The voltage stabilization sub-circuit is coupled to a first control terminal of the driving transistor and is configured to keep a voltage at the first control terminal of the driving transistor to be stable in a reset stage. The voltage at the first control terminal of the driving transistor is kept stable through the voltage stabilization sub-circuit in the reset stage, so that the voltage at the output of the driving transistor is relatively constant, characteristics of a switching element of the driving transistor is ensured, an effect of homogeneous luminance is realized, and a display effect and a stability of displaying of the display panel are improved.

15 Claims, 4 Drawing Sheets

PIXEL DRIVING CIRCUIT HAVING A VOLTAGE STABILIZATION SUB-CIRCUIT AND DISPLAY PANEL THEREOF

CROSS-REFERENCE TO RELATED APPLICATION

Pursuant to 35 U.S.C. § 119 and the Paris Conversion, this application claims priority to Chinese Patent Application No. 202210740799.2 filed Jun. 28, 2022, the entire contents of which are incorporated herein by reference.

FIELD

The present application relates to the field of displaying technology, and more particularly to a pixel driving circuit, a display panel and a display device.

BACKGROUND

The statements provided herein are merely background information related to the present application, and do not necessarily constitute any prior arts. With the development of the field of liquid crystal display (LCD), organic light emitting diode (OLED) display technology has been gradually widely used in products such as television (TV), mobile phones, and notebooks due to OLED device's technological advantages such as self-luminescence, lightness and thinness. Since OLED is a current driven display device, when a threshold voltage Vth of a thin film transistor (TFT) is shifted, the current that drives the OLED will be unstable and will be variable. Thus, inhomogeneous luminance is further caused. At present, current compensation is performed through a driving and compensation circuit. The driving and compensation circuit includes a TFT and a capacitance connected to a pixel unit, a control terminal of the TFT is connected to a data voltage, an input of the TFT is connected to a driving voltage, an output and a control terminal of the TFT are connected to the capacitance, so that the voltage written to the pixel unit can be adjusted by the data voltage. However, aiming at the conventional display panel and the display panel having low power consumption (low frequency), there exist technical problems of unstable image display and variation of display effect in a long time, and a technical solution for solving the above-mentioned technical problems is not existed currently.

SUMMARY

The present application provides a pixel driving circuit, a display panel and a display device, which aim at solving the problems in the exemplary technology that image display is unstable and the display effect is changed in a long time period.

In the first aspect, one embodiment of the present application provides a pixel driving circuit, applied to a display panel including a plurality of pixels, the pixel driving circuit includes:

a driving sub-circuit including a driving transistor, an input of the driving transistor is coupled to a driving voltage terminal, and an output of the driving transistor is coupled to a sub-pixel.

The pixel driving circuit further includes a data-writing sub-circuit, an output of the data-writing sub-circuit is coupled between the input of the driving transistor and the driving voltage terminal, and the data-writing sub-circuit is configured to write a data voltage to the driving transistor in a compensation and writing stage.

The pixel driving circuit further includes a voltage stabilization sub-circuit coupled to a control terminal of the driving transistor and configured to keep a voltage at the first control terminal of the driving transistor to be stable in a reset stage.

In one preferable embodiment, the voltage stabilization sub-circuit includes:

a voltage stabilization transistor, where a control terminal of the voltage stabilization transistor is coupled to a first scanning line, and an input and an output of the voltage stabilization transistor are coupled to the driving voltage terminal and the first control terminal of the driving transistor respectively, so that the first control terminal of the driving transistor is coupled to the driving voltage terminal.

In one preferable embodiment, the pixel driving circuit further includes a storage capacitor, where one end of the storage capacitor is coupled to the first control terminal of the driving transistor, and the other end of the storage capacitor is coupled to the output of the driving transistor.

In one preferable embodiment, the data-writing sub-circuit includes:

- a first-data-write-control transistor, a control terminal of the first-data-write-control transistor is coupled to a second scanning line, and an input and an output of the first-data-write-control transistor are coupled to the data voltage terminal and the input of the driving transistor, respectively.

The data-writing sub-circuit further includes a second-data-write-control transistor, where a control terminal of the second-data-write-control transistor is coupled to the second scanning line, an input of the second-data-write-control transistor is coupled to a first control terminal of the driving transistor, and an output of the second-data-write-control transistor is coupled to the output of the driving transistor; in a writing process of the data voltage, the data voltage is written to the first control terminal of the driving transistor through the first-data-write-control transistor, the driving transistor and the second-data-write-control transistor.

The pixel driving circuit further includes a first-input-control transistor, where a control terminal of the first-input-control transistor is coupled to an emission-signal line, and an input and an output of the first-input-control transistor are coupled to the driving voltage terminal and the input of the driving transistor respectively, so that the input of the driving transistor is coupled to the driving voltage terminal.

The pixel driving circuit further includes:

- a second-input-control transistor, where a control terminal of the second-input-control transistor is coupled to the emission-signal line, and an input and an output of the second-input-control transistor are coupled to the sub-pixel and the output of the driving transistor respectively, so that the output of the driving transistor is coupled to the sub-pixel.

In one preferable embodiment, the pixel driving circuit further includes: a reset sub-circuit configured to pull down a voltage at one end of the storage capacitor coupled to the sub-pixel to a reset voltage, in response to a response-to-reset voltage output by a response-to-reset voltage line.

In one preferable embodiment, the reset sub-circuit includes a reset transistor, where a control terminal of the reset transistor is coupled to the response-to-reset voltage line, and an input and an output of the reset transistor are coupled between the output of the driving transistor and a reset voltage terminal.

In one preferable embodiment, the response-to-reset voltage line is the first gate signal control line;

As an alternative, the pixel driving circuits are cascaded in the display panel, a first gate control signal of the last pixel driving circuit is used as the second gate control signal of the next pixel driving circuit adjacent to the last pixel driving circuit, and the reset response signal as output by the response-to-reset voltage line is the first gate control signal of the previous pixel driving circuit after a delay processing.

In one preferable embodiment, the driving transistor further includes a second control terminal, the first control terminal of the driving transistor and an active layer of the driving transistor are constituted as a first stray capacitance, and the second control terminal is coupled to a direct current (DC) signal terminal, so that the second control terminal of the driving transistor and the active layer are constituted as a second stray capacitance.

In the second aspect, a pixel driving method is provided in one embodiment of the present application, the pixel driving method is applied to the aforesaid pixel driving circuit, and includes:

A data voltage is written to the driving transistor in a compensation and writing stage of a driving period;

In a luminescence stage, a fixed potential is written to the first control terminal and the output of the driving transistor so as to keep voltages at the first control terminal and the output of the driving transistor to be stable.

In the third aspect, a display panel is provided, the display panel includes a plurality of pixels, where each of the plurality of pixels includes a plurality of sub-pixels, and each of the plurality of sub-pixels is coupled to one of the pixel driving circuits.

In the fourth aspect, a display device is provided in one embodiment of the present application, where the display device includes the display panel.

It is clear from the above-mentioned technical solutions that, in the pixel driving circuit, the display panel and the display device according to the present application, the voltage at the first control terminal of the driving transistor in the reset stage is kept to be stable through the voltage stabilization sub-circuit, so that the voltage at the output of the driving transistor is relatively constant. Thus, the characteristics of the switching element of the driving transistor are ensured, a homogeneous luminance effect of the display panel is realized, and the display effect and the stability of displaying of the display panel are improved.

BRIEF DESCRIPTION OF THE DRAWINGS

In order to describe the embodiments of the present application or the existing technology more clearly, a brief introduction regarding the accompanying drawings that need to be used for describing the embodiments of the present application or the existing technology is given below. It is obvious that the accompanying drawings described below are merely some embodiments of the present application, a person of ordinary skill in the art may also acquire other drawings according to the current drawings without paying creative labor.

DETAILED DESCRIPTION OF THE EMBODIMENTS

In order to make the purpose, the technical solutions and the advantages of the present application be clearer and more understandable, the present application will be further described in detail below with reference to accompanying figures and embodiments. It should be understood that the embodiments described in detail herein are merely intended to illustrate but not to limit the present application.

Additionally, terms such as "the first" and "the second" are merely for the purpose of illustration, and thus should not be considered as indicating or implying any relative importance, or implicitly indicating the number of indicated technical features. Thus, technical feature(s) restricted by "the first" or "the second" may include one or more such technical feature(s) explicitly or implicitly. In the description of the present application, "a plurality of" has the meaning of at least two, unless there is additional explicit and specific limitation. It should be noted that the pixel driving circuit, the display panel and the display device 20 disclosed in the present application can be used in the field of displaying technology and can also be used in other fields other than the field of displaying technology. The application fields of the pixel driving circuit, the display panel and the display device 20 disclosed in the present application are not limited.

Figure 1:
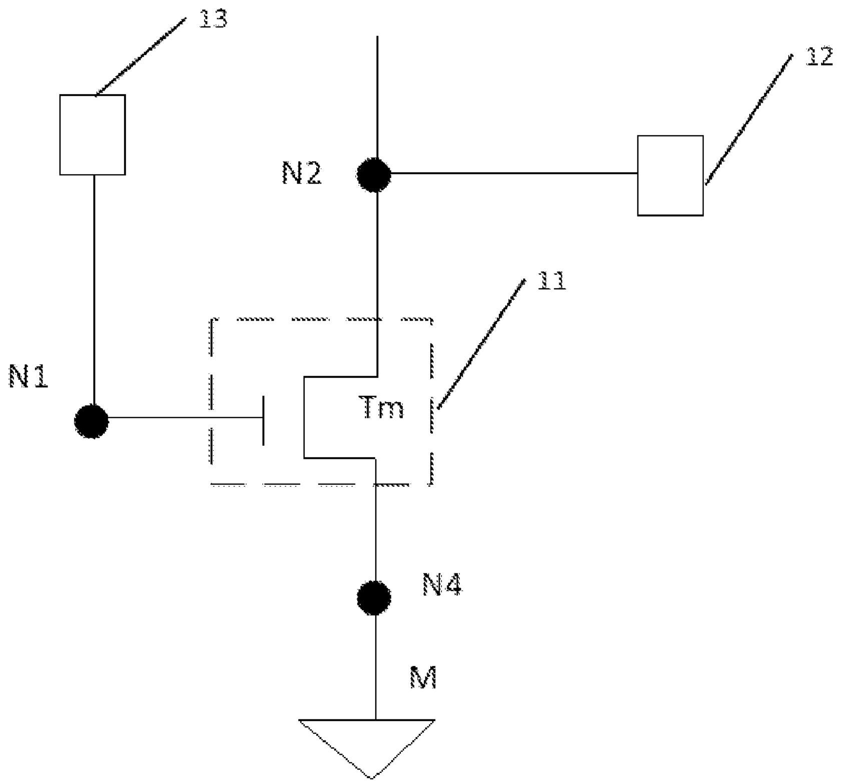
FIG. 1 illustrates a schematic modular diagram of a pixel driving circuit according to one embodiment of the present application.

FIG. 1 is a schematic structural diagram of a pixel driving circuit according to the present application. As shown in FIG. 1, the pixel driving circuit includes: a driving sub-circuit 11, the driving sub-circuit 11 further includes a driving transistor TM, an input 111 of the driving transistor Tm is coupled to a driving voltage terminal VDD, and an output 112 of the driving transistor Tm is coupled to a sub-pixel M; a data-writing sub-circuit 12, where an output of the data-writing sub-circuit 12 is coupled between the input 112 of the driving transistor Tm and the driving voltage terminal VDD, and is configured to write a data voltage into the driving transistor Tm in a compensation and writing stage; and a voltage stabilization sub-circuit 13 coupled to the first control terminal 113 of the driving transistor Tm and configured to keep a voltage at the first control terminal 113 of the driving transistor Tm to be stable in a reset stage.

Furthermore, in this embodiment of the present application, the pixel driving circuit is applied to the display panel. The display panel includes a plurality of sub-pixels, and the sub-pixels can be red, blue or green sub-pixels. Generally, three sub-pixels constitute one pixel unit, and this pixel unit is the smallest integrated unit that constitutes a pixel arrangement structure. This pixel arrangement structure constitutes a display area of the display panel, that is, the pixel arrangement includes a plurality of pixels arranged in a specific arrangement. Each pixel includes a plurality of sub-pixels, such as a red sub-pixel, a blue sub-pixel, and a green sub-pixel. Each sub-pixel is electrically connected to driving integrated circuit (IC) through one single driving line, and the driving IC is used to drive the sub-pixels in the pixels to be powered up to emit color light.

It can be known that, in the present application, the sub-pixels in one pixel unit can include red sub-pixels, blue sub-pixels and green sub-pixels, and the number of sub-pixels can be three or four, etc. The number of sub-pixels included in one single pixel unit is not limited in the present application.

When there are three sub-pixels in one pixel unit, the sub-pixels are generally red, blue and green sub-pixels. When there are four sub-pixels, the colors of the sub-pixels can be red, blue, green and other color that is different from red, blue and green. For example, said other color can include white, yellow or cyan. It should be noted that if said other color is white, the display luminance of the display device 20 with this pixel arrangement structure can be improved. If said other color is another color, the color gamut of the display device 20 can be increased, said other color is not limited in the present application.

In the exemplary technology, the operating stage of the pixel driving circuit includes a reset stage, a compensation stage, a writing stage, and a luminescence stage. The operation of the driving transistor Tm is most critical during the operation of the circuit architecture of the pixel driving circuit. The main reasons of the poor display effect of the circuit architecture include: first, the fixed current leakage attribute of the driving transistor Tm causes the potential at the control terminal of the driving transistor to be variable, so that the characteristics of the switching element of the driving transistor Tm is influenced; second, when a gate insulation film of the three-terminal device is changed, the characteristics of the three-terminal device will be significantly changed; third, due to the fact that the voltages at the control terminal and the output of the driving transistor are continuously dropped, so that electric leakage continuously occurs at the control terminal and the output of the driving transistor. Therefore, based on the aforesaid findings, according to the inventors of the present application, a voltage stabilization sub-circuit is first configured to stabilize the voltages at the control terminal and the output of the driving transistor, thereby solving the problem of poor display effect caused due to at least one of the above-mentioned reasons, and improving the display effect. It can be known that, according to the pixel driving circuit of the present application, the voltage stabilization sub-circuit keeps the voltage at the first control terminal of the driving transistor to be stable in the reset stage, so that the voltage at the output of the driving transistor is enabled to be relatively constant. Thus, the characteristics of the switching element of the driving transistor are ensured, an effect of homogeneous luminance is realized, the display effect and the stability of displaying of the display panel are improved.

Figure 2:
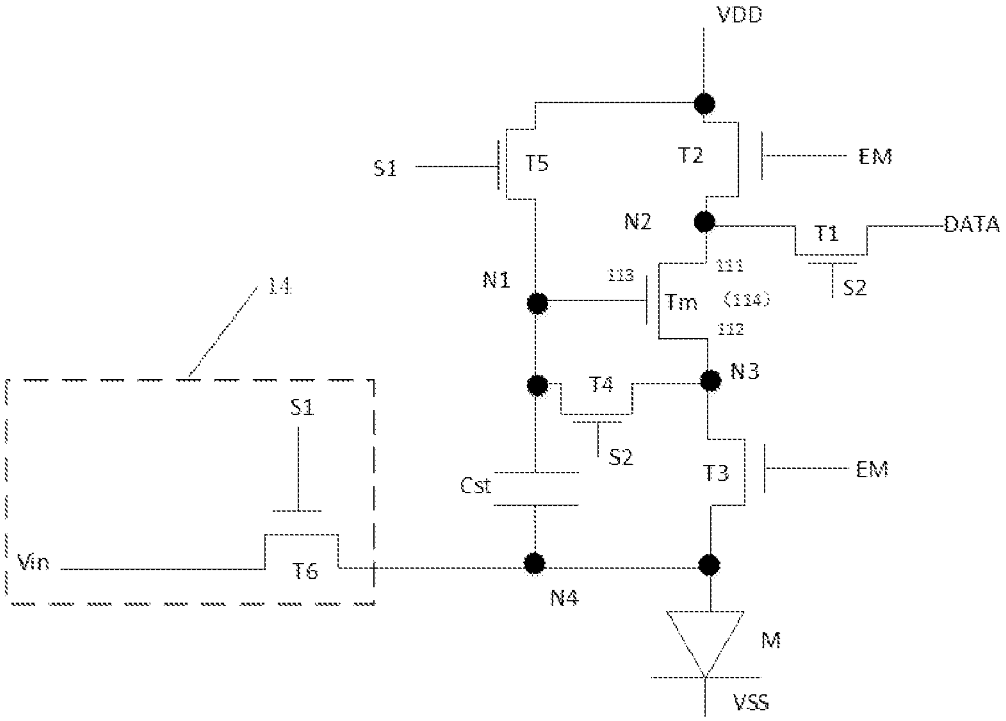
FIG. 2 illustrates a schematic circuit configuration of the pixel driving circuit in one embodiment of the present application.

In one preferable embodiment, as shown in FIG. 2, the voltage stabilization sub-circuit 13 includes:

a voltage stabilization transistor T5, a control terminal of the voltage stabilization transistor T5 is coupled to a first scanning line S1, and an input 111 and an output 112 of the voltage stabilization transistor T5 are respectively coupled to the driving voltage terminal VDD and the first control terminal 113 of the driving transistor TM, so that the first control terminal 113 of the driving transistor TM is coupled to the driving voltage terminal VDD.

It can be understood that, in the present application, the voltage stabilization transistor T5 is connected to the driving voltage terminal VDD, and the first scanning line S1 is only controlled to be at the high level in the reset stage. Then, in the reset stage, the driving voltage is written to the first control terminal of the driving transistor Tm (i.e., corresponding to the node N1), so that the node N1 remains stable in the reset stage.

Furthermore, in one preferable embodiment, the method of configuration of the storage capacitor in the present application is different from that of the conventional storage capacitor. In the present application, the storage capacitor Cst is configured in the manner described below:

As shown in FIG. 2, the pixel driving circuit of the present application further includes a storage capacitor Cst. One end of the storage capacitor Cst is coupled to the first control terminal 113 of the driving transistor Tm, and the other end of the storage capacitor Cst is coupled to the sub-pixel M. In the prior art, the storage capacitor Cst is usually arranged between the VDD node and the node N1. In the present application, the storage capacitor Cst is arranged between the node N1 and the node N4, and the fixed potential of the storage capacitor Cst is electrically connected to the anode of the node N4. Thus, the potential voltage of Vgs of the driving transistor Tm remains relatively constant during the luminescence stage, and the characteristics of the switching element of the driving transistor Tm are ensured.

Certainly, it can be known that, the conventional storage capacitor configuration method (i.e., arranging the storage capacitor between the driving voltage terminal and the first control terminal) can also be adopted in the present application. Details of the conventional storage capacitor configuration method are not repeatedly described here. However, it can be understood that, in the present application, the voltage of the node N1 is kept stable in the luminescent stage according to the change of the configuration method of the storage capacitor, and a synergistic effect is generated according to the voltage stabilization transistor.

During use, an input of a voltage stabilization transistor T5 is connected to the driving voltage VDD. Thus, when the first control line S1 outputs a high level, the voltage stabilization transistor T5 is switched on, so that the node N1 is pulled high. Since the driving voltage VDD is a positive voltage signal, the source electrode and the drain electrode of the driving transistor Tm are positive electrical signals. The voltage difference between the electrical signals is reduced, so that the leakage current of the TFT device is further reduced, and a problem of electric leakage of the node N1 is improved.

Based on the storage capacitor and the voltage stabilization transistor, the control terminal of the driving transistor TM (corresponding to the node N1 in FIG. 2) and the output of the driving transistor TM (corresponding to the node N4 and the node N3 in FIG. 2) are kept relatively stable.

Furthermore, in one preferable embodiment of the present application, as shown in FIG. 2, the data-writing sub-circuit 12 includes:

a first-data-write-control transistor T1. A control terminal of the first-data-write-control transistor T1 is coupled to the second scanning line S2, and an input and an output of the first-data-write-control transistor T1 are respectively coupled to the driving voltage terminal VDD and an input of the driving transistor Tm. The data-writing sub-circuit 12 further includes a second-data-write-control transistor T4, where a control terminal of the second-data-write-control transistor T4 is coupled to the second scanning line S2, an input of the second-data-write-control transistor T4 is coupled to a first control terminal of the driving transistor Tm, and an output of the second-data-write-control transistor T4 is coupled to the output of the driving transistor Tm. Where during a written process of the data voltage, the data voltage is written to the first control terminal 113 of the driving transistor Tm through the first-data-write-control transistor T1, the driving transistor Tm and the second-data-write-control transistor T4.

Furthermore, in one preferable embodiment, in order to realize respective control of the compensation and writing stage, the luminance stage, the pixel driving circuit of the present application further includes: a first-input-control transistor T2, where a control terminal of the first-input-control transistor T2 is coupled to an emission-signal line EM, and an input and an output of the first-input-control transistor T2 are coupled to the driving voltage terminal VDD and the input of the driving transistor Tm respectively, so that the input of the driving transistor Tm is coupled to the driving voltage terminal VDD.

The pixel driving circuit further includes a second-input-control transistor T3, where a control terminal of the second-input-control transistor T3 is coupled to the emission-signal line EM, and an input and an output of the second-input-control transistor T3 are respectively coupled to the sub-pixel M and the output of the driving transistor Tm, so that the output of the driving transistor Tm is coupled to the sub-pixel M.

Furthermore, in order to reset the pixel driving circuit of the present application, the pixel driving circuit of the present application may further include a reset sub-circuit, where the reset sub-circuit is configured to pull down a voltage at one end of the storage capacitor coupled to the sub-pixel M to a reset voltage in response to a response-to-reset voltage output by a response-to-reset voltage line.

In this embodiment, the driving transistor Tm is switched on according to the response-to-reset voltage with high level as output by the response-to-reset voltage line in the reset stage, so that the node N4 of the storage capacitor is pulled down to the reset voltage.

As an example, the reset sub-circuit includes a reset transistor T6, where a control terminal of the reset transistor T6 is coupled to the response-to-reset voltage line, and an input and an output of the reset transistor T6 are coupled between an output of the driving transistor T6 and a reset voltage terminal Vin.

Furthermore, referring to FIG. 2, in one preferable embodiment, the response-to-reset voltage line is the first gate signal control line S1. That is, the first gate signal control line S1 coupled to a control terminal of the voltage stabilization transistor T5 is multiplexed to the reset sub-circuit, so that the number of control lines is reduced.

In one embodiment that is not shown in the figures, the pixel driving circuits are cascaded in the display panel, a first gate control signal of the last pixel driving circuit is used as the second gate control signal of the next pixel driving circuit adjacent to the last pixel driving circuit, and the reset response signal as output by the response-to-reset voltage line is the first gate control signal of the previous pixel driving circuit after a delay processing.

In one preferable embodiment, the present application may further solve the problem that the potential at the control terminal of the driving transistor Tm is variable due to the inherent current leakage attribute of the driving transistor Tm, so that the characteristics of the switching element of the driving transistor Tm is influenced. The present application may further solve the problem that the characteristics of the three-terminal device are seriously changed when the gate insulation layer film of the three-terminal device is changed, as shown in FIG. 1 and FIG. 2.

Figure 3:
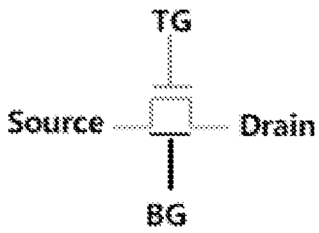
FIG. 3 illustrates a schematic circuit configuration of a driving transistor in one embodiment of the present application.

In one preferable embodiment, as shown in FIG. 3, the driving transistor Tm further includes a second control terminal, the first control terminal and the active layer of the driving transistor Tm are constituted as a first stray capacitance Cgd, and the second control terminal is coupled to a direct current (DC) signal terminal, so that the second control terminal and the active layer are constituted as a second stray capacitance Cgd2.

In particular, the driving transistor Tm is configured as a four-terminal device, the first control terminal 113 is configured to perform a driving control, the second control terminal 114 performs an auxiliary driving control and adjusts a threshold, so that a stable current can be formed. Furthermore, the voltage stabilization sub-circuit writes a preset voltage into the second terminal of the capacitor element Cst in the luminance stage, so that the voltage at the output of the driving transistor Tm is relatively constant. The characteristics of the switching element of the driving transistor Tm are ensured according to the first control terminal 113, the second control terminal 114, and the voltage stabilization sub-circuit, a homogeneous luminance is realized, and the optimal display effect and stable displaying of the display panel are provided.

Furthermore, it should be understood that the transistor of the present application is a thin film transistor (TFT). Certainly, some components of the pixel driving circuit can be arranged in a non-display area of the display panel. Therefore, in some embodiments, the transistors can also be other types of transistors, and the types of the transistors are not limited in the present application.

The switching element in the present application generally includes a control terminal, an input and an output. Correspondingly, the control terminal is the gate electrode of the switching element, and the input and the output of the switching element are the source electrode and the drain electrode of the switching element, respectively.

Figure 5:
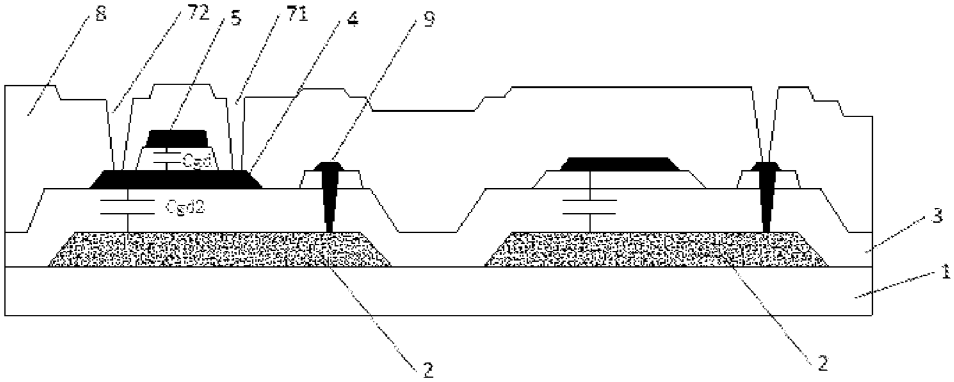
FIG. 5 illustrates a laminated structure of a four-terminal device.
Figure 6:
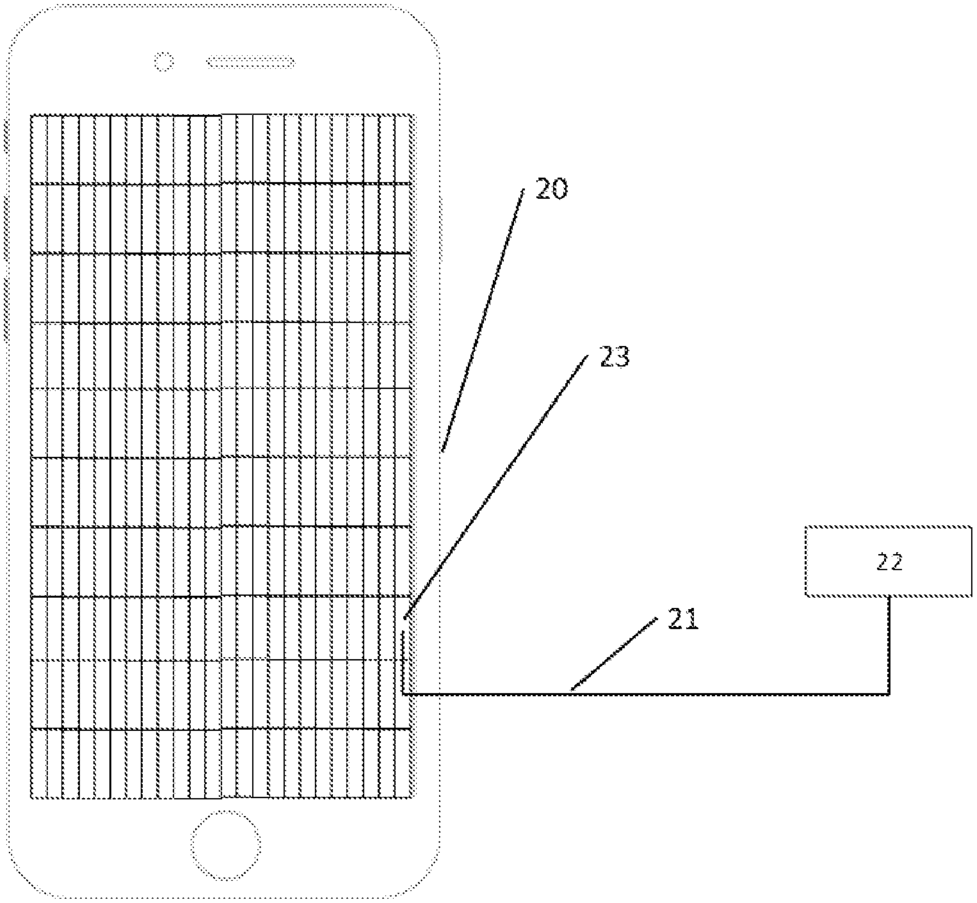
FIG. 6 illustrates a schematic structural diagram of a display device according to one embodiment of the present application.

As shown in FIG. 3, the four-terminal device is described in detail below. The driving transistor Tm in the present application includes: a first control terminal (TG), an input (source electrode) and an output (Drain electrode). Furthermore, the driving switch of the present application further includes a second control terminal (BG terminal) coupled to the DC signal line. In particular, as shown in FIG. 5, the four-terminal device includes: a substrate 1; a first metal layer 2 formed on one side surface of the substrate 1; an active layer 4 formed on one side of the first metal layer 2 away from the substrate 1; a switching element structure located on one side of the active layer 4 away from the first metal layer 2. The switching element structure includes a gate electrode composed of a second metal layer 5, a source electrode (which is formed by depositing metal in the via 72 in FIG. 1) located at two sides of the second metal layer 5 and is in electrical contact with the active layer 4, and a drain electrode (formed by depositing metal in the via 71 in FIG. 1). Where the first metal layer 2 is coupled to a DC (Direct Current) voltage terminal.

In this embodiment of the present application, the first metal layer 2 is formed on one side surface of the substrate 1. The first metal layer 2 is constituted as a bottom gate of the thin film Transistor (TFT) in this embodiment of the present application. In the present application, the bottom gate can be electrically connected to an external DC (Direct Current) wire through the conductive metal 9 deposited in the via. For example, one end terminal of the DC wire is welded to the conductive metal on the via.

The active layer 4 is formed on one side of the first metal layer 2 away from the substrate 1, that is, the active layer 4 is located at the top of the first metal layer 2. During a fabrication process, a buffer layer 3 may be arranged between the active layer 4 and the first metal layer 2. In one aspect, an electric isolation function is realized. In another aspect, mechanical support and mechanical cushioning are provided.

The second metal layer 5 is formed on the active layer 4. The second metal layer 5 forms a top gate. A gate insulating film (GI) layer 6 may be arranged between the second metal layer 5 and the active layer 4.

Furthermore, an interlayer medium 8 is deposited on the active layer 4. Then, an exposure and mask process is performed on the interlayer medium 8 so as to form a pair of vias 71 and 72 on the active layer. Then, metals are deposited on the via 71 and the via 72 so as to form the source electrode and the drain electrode which are located at both sides of the second metal layer 5 and are in electrical contact with the active layer 4. In this way, the structure of the switching element of the present application is formed. In this structure, the metals deposited in the pair of vi as are taken as the source electrode and the drain electrode, and the second metal layer is taken as a gate electrode.

In this embodiment, the first metal layer is provided and is coupled to the DC voltage terminal, the capacitance Cgd2 is additionally provided as compared to the three-terminal TFT in the exemplary technology. Furthermore, a plate area of Cgd2 (i.e., the second stray capacitance) can be configured under a relatively unrestricted environment. Thus, in one aspect, the capacitance Cgd2 can have a larger size. In another aspect, the capacitance value of the capacitance Cgd2 can be flexibly adjusted, so that the TFT is made as a four-terminal device in the present application, a metal layer is used as the bottom gate of the device at the opposite side of the insulating layer at the bottom of the device. The bottom gate is connected to a DC signal in the circuit. The capacitance Cgs2 is formed between the bottom gate, and the source electrode and the drain electrode of the device. Since the area of the bottom gate usually covers the other electrodes of the device, the capacitance of the newly formed capacitance Cgs2 has a great capacitance value. When a capacity coupling effect occurs, the change of the potential for driving the control terminal of the TFT depends on the stray capacitance (i.e., the first stray capacitance) of the switching element TFT, the capacitance value of the storage capacitor for driving the control terminal of the TFT, and the capacitance value of the newly formed capacitance Cgd2. Thus, the capacitance Cgs2 can be used as fixed capacitance storage element for effectively offsetting the influence of capacitance feedthrough effect of the capacitance Cgd and the capacitance Cst. Thus, a voltage stabilization effect is further realized, and a good display effect of pixels is further ensured.

Certainly, the driving transistor Tm may also be formed by TFT with other structure, as long as the second control terminal is coupled to the DC voltage terminal.

In the aforesaid embodiment, other switching elements can also be four-terminal devices, the switching elements are not limited in the present application.

Figure 4:
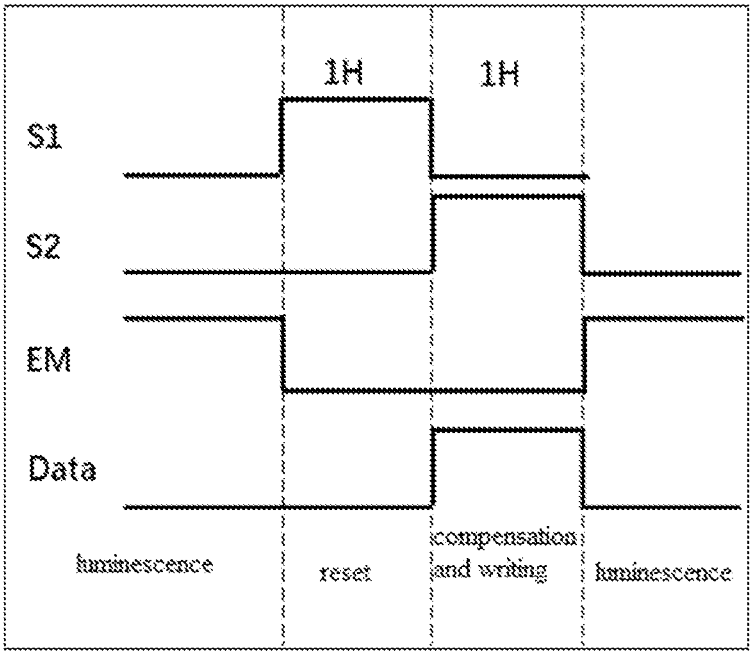
FIG. 4 illustrates a schematic diagram of timing control corresponding to FIG. 2.

The present application is described in detail below with reference to a timing diagram shown in FIG. 4.

First, in the reset stage, the emission signal line EM is pulled down, the first-input-control transistor T2 and the second-input-control transistor T3 are switched off, so that the current of the OLED device used for luminance is cut off. The first scanning line S1 is pulled up, the voltage stabilization transistor T5 and the reset transistor T6 are switched on, the node N1 is reset to the driving voltage VDD, and the node N4 is reset to a signal voltage Vin of the reset signal line.

Then, in the compensation stage and the writing stage, the emission signal line EM is continued to be at low level, so that the first-input-control transistor T2 and the second-input-control transistor T3 are remained in a switched-off state; the first scanning line S1 is pulled down, such that the voltage stabilization transistor T5 and the reset transistor T6 are switched off. The second scanning line S2 is pulled up, the first-data-write-control transistor T1, the second-data-write-control transistor T4 are switched on, and the data voltage Data is written to the node N2. Since the driving voltage VDD is written to the node N1 in the previous time period, such that the driving transistor Tm is switched on, the data voltage DATA is written back to the node N1 through the driving transistor Tm and the second-data-write-control transistor T4 until the driving transistor Tm is switched off.

Finally, in the luminescence stage, both the first scanning line S1 and the second scanning line S2 are at a low potential by switching. The first-data-write-control transistor T1, the voltage stabilization transistor T5, the second-data-write-control transistor T4 and the reset transistor T6 are switched off, the potential of the node N1 is kept stable, so that the driving transistor Tm is kept at a switched-on state. The emission signal line EM is pulled up, so that the first-input-control transistor T2 and the second-input-control transistor T3 are switched on, the driving voltage VDD enables current to flow into the anode of the OLED device through the first-input-control transistor T2, the driving transistor Tm and the second-input-control transistor T3, thereby providing electron holes for the OLED luminescence device, where the electron holes are combined with the cathode transmitted in the cathode to emit light.

Furthermore, in this embodiment of the present application, due to the increase of the leakage current of the display panel under high temperature, there is a possibility that the current of the display panel may flow back to the driving voltage terminal VDD, thereby affecting the stability of the current provided by the driving voltage at the driving voltage terminal VDD. The diode element D1 of the present application can prevent large current of the display panel from flowing back to the driving voltage of the driving voltage terminal VDD.

It is obvious to the person of ordinary skill in the art that, "coupling" or "coupled to" as recited in the present application may refer to a direct or indirect electrical connection. For example, "A is coupled to B" means that A and B may be electrically connected directly, or alternatively, A and B may be electrically connected through C. The recitations of "coupling" and "coupled to" are not limited in the present application.

A display panel is further provided in the present application, this display panel includes a plurality of pixels, each of the plurality of pixels includes a plurality of sub-pixels, and each of the plurality of sub-pixels is coupled to one pixel driving circuit described above.

It can be understood that the display device 20 in the present application keeps the voltage at the first control terminal of the driving transistor in the reset stage to be stable through the voltage stabilization sub-circuit, so that the voltage at the output of the driving transistor is relatively constant. Thus, the characteristics of the switching element of the driving transistor are ensured, an effect of homogeneous luminance of the display panel is realized, and the display effect and the stability of displaying of the display panel are improved.

As shown in FIG. 5, a display device 20 according to the present application includes a display panel and the pixel driving circuit 22 in the first embodiment. The display panel includes a plurality of pixels. Each of the plurality of pixels includes a plurality of sub-pixels 23. Each of the plurality of sub-pixels 23 is coupled to the pixel driving circuit through a conducting wire 21.

In implementation, the display device 20 according to the present application may be any product or component having a display function, this product or component can be such as a mobile phone, a tablet computer, a television, a display, a notebook computer, a digital photo frame, a navigator, and the like.

It can be understood that the display device 20 in the present application keeps the voltage at the first control terminal of the driving transistor to be stable in the reset stage through the voltage stabilization sub-circuit, so that the voltage at the output of the driving transistor is relatively constant. Thus, the characteristics of the switching element of the driving transistor are ensured, an effect of homogeneous luminance of the display panel is realized, and the display effect and the stability of displaying of the display panel are improved.

A driving method for the display device 20 is further provided according to the present application. The driving method is performed by using the pixel driving circuit, and the driving method includes:

a data voltage is written to the driving transistor Tm in a compensation and writing stage of a driving period.

In the luminescence stage, a fixed potential is written to the first control terminal and the output of the driving transistor so as to keep voltages at the first control terminal and the output of the driving transistor to be stable.

First, in the reset stage, the emission signal line EM is pulled down, the first-input-control transistor T2 and the second-input-control transistor T3 are switched off, so that the current of the OLED device used for luminance is cut off. The first scanning line S1 is pulled up, the voltage stabilization transistor T5 and the reset transistor T6 are switched on, the node N1 is reset to the driving voltage VDD, and the node N4 is reset to a signal voltage Vin of the reset signal line.

Then, in the compensation stage and the writing stage, the emission signal line EM is continued to be at low level, so that the first-input-control transistor T2 and the second-input-control transistor T3 are remained in a switched-off state; the first scanning line S1 is pulled down, such that the voltage stabilization transistor T5 and the reset transistor T6 are switched off. The second scanning line S2 is pulled up, the first-data-write-control transistor T1, the second-data-write-control transistor T4 are switched on, and the data voltage Data is written to the node N2. Since the driving voltage VDD is written to the node N1 in the previous time period, such that the driving transistor Tm is switched on, the data voltage DATA is written back to the node N1 through the driving transistor Tm and the second-data-write-control transistor T4 until the driving transistor Tm is switched off.

Finally, in the luminescence stage, both the first scanning line S1 and the second scanning line S2 are at a low potential by switching. The first-data-write-control transistor T1, the voltage stabilization transistor T5, the second-data-write-control transistor T4 and the reset transistor T6 are switched off, the potential of the node N1 is kept stable, so that the driving transistor Tm is kept at a switched-on state. The emission signal line EM is pulled up, so that the first-input-control transistor T2 and the second-input-control transistor T3 are switched on, the driving voltage VDD enables current to flow into the anode of the OLED device through the first-input-control transistor T2, the driving transistor Tm and the second-input-control transistor T3, thereby providing electron holes for the OLED luminescence device, where the electron holes are combined with the cathode transmitted in the cathode to emit light.

It can be seen from the above solution that, according to the driving method in the embodiments of the present application, the driving transistor is further configured as the four-terminal device, the first control terminal is configured to perform driving control, the second control terminal is configured to perform an auxiliary driving control and adjusts a threshold, so that a stable current can be formed. The voltage stabilization sub-circuit writes the preset voltage to the second terminal of the capacitor element in the luminance stage, so that the voltage at the output of the driving transistor is relatively constant. Thus, the characteristics of the switching element of the driving transistor are ensured, the effect of homogeneous luminance is realized, and the display effect and the stability of displaying of the display panel are provided.

It should be noted that, with respect to the embodiment of the pixel driving circuit, the embodiment of the display device 20, the embodiment of the pixel driving method according to the embodiments of the present application, reference can be made to each other, and these embodiments are not limited in the present application. Improved methods, which can be easily thought out by any person who is skilled in the art and is familiar with the technical field within the technical scope disclosed in the present application, should all be included in the protection scope of the present application. Thus, these improved methods are not repeatedly described here.

The foregoing embodiments are only some preferable embodiments of the present application, and should not be regarded as limitations to the present application. All modifications, equivalent replacements and improvements, which are made within the spirit and the principle of the present application, should all be included in the protection scope of the present application.

What is claimed is:

1. A pixel driving circuit, applied to a display panel comprising a plurality of pixels, the pixel driving circuit comprising:

a driving sub-circuit which comprises a driving transistor, wherein an input of the driving transistor is coupled to a driving voltage terminal, and an output of the driving transistor is coupled to a sub-pixel;

a data-writing sub-circuit, wherein an output of the data-writing sub-circuit is coupled between the input of the driving transistor and the driving voltage terminal, and the data-writing sub-circuit is configured to write a data voltage to the driving transistor in a compensation and writing stage; and a voltage stabilization sub-circuit coupled to a control terminal of the driving transistor and configured to keep a voltage at the first control terminal of the driving transistor to be stable in a reset stage, wherein the driving transistor further comprises a second control terminal, the first control terminal of the driving transistor and an active layer of the driving transistor are constituted as a first stray capacitance, and the second control terminal is coupled to a direct current (DC) signal terminal, so that the second control terminal of the driving transistor and the active layer are constituted as a second stray capacitance.

2. The pixel driving circuit according to claim 1, wherein the voltage stabilization sub-circuit comprises:

a voltage stabilization transistor, wherein a control terminal of the voltage stabilization transistor is coupled to a first scanning line, and an input and an output of the voltage stabilization transistor are coupled to the driving voltage terminal and the first control terminal of the driving transistor respectively, so that the first control terminal of the driving transistor is coupled to the driving voltage terminal.

3. The pixel driving circuit according to claim 1, wherein the pixel driving circuit further comprises:

a storage capacitor, wherein one end of the storage capacitor is coupled to the first control terminal of the driving transistor, and the other end of the storage capacitor is coupled to the output of the driving transistor.

4. The pixel driving circuit according to claim 3, further comprising a reset sub-circuit configured to pull down a voltage at one end of the storage capacitor coupled to the sub-pixel to a reset voltage, in response to a response-to-reset voltage output by a response-to-reset voltage line.

5. The pixel driving circuit according to claim 4, wherein the reset sub-circuit comprises a reset transistor, a control terminal of the reset transistor is coupled to the response-to-reset voltage line, and an input and an output of the reset transistor are coupled between the output of the driving transistor and a reset voltage terminal.

6. The pixel driving circuit according to claim 1, wherein the data-writing sub-circuit comprises:

a first-data-write-control transistor, wherein a control terminal of the first-data-write-control transistor is coupled to a second scanning line, and an input and an output of the first-data-write-control transistor are coupled to the data voltage terminal and the input of the driving transistor, respectively; and a second-data-write-control transistor, wherein a control terminal of the second-data-write-control transistor is coupled to the second scanning line, an input of the second-data-write-control transistor is coupled to a first control terminal of the driving transistor, and an output of the second-data-write-control transistor is coupled to the output of the driving transistor; in a writing process of the data voltage, the data voltage is written to the first control terminal of the driving transistor through the first-data-write-control transistor, the driving transistor and the second-data-write-control transistor.

7. The pixel driving circuit according to claim 1, further comprising:

a first-input-control transistor, wherein a control terminal of the first-input-control transistor is coupled to an emission-signal line, and an input and an output of the first-input-control transistor are coupled to the driving voltage terminal and the input of the driving transistor respectively, so that the input of the driving transistor is coupled to the driving voltage terminal; and a second-input-control transistor, wherein a control terminal of the second-input-control transistor is coupled to the emission-signal line, and an input and an output of the second-input-control transistor are coupled to the sub-pixel and the output of the driving transistor respectively, so that the output of the driving transistor is coupled to the sub-pixel.

8. A display panel, comprising a plurality of pixels, each of the plurality of pixels comprises a plurality of sub-pixels, and each of the plurality of sub-pixels is coupled to one pixel driving circuit applied to a display panel comprising a plurality of pixels; wherein the pixel driving circuit comprises:

a driving sub-circuit which comprises a driving transistor, wherein an input of the driving transistor is coupled to a driving voltage terminal, and an output of the driving transistor is coupled to a sub-pixel;

a data-writing sub-circuit, wherein an output of the data-writing sub-circuit is coupled between the input of the driving transistor and the driving voltage terminal, and the data-writing sub-circuit is configured to write a data voltage to the driving transistor in a compensation and writing stage; and a voltage stabilization transistor coupled to a control terminal of the driving transistor and configured to keep a voltage at the first control terminal of the driving transistor to be stable in a reset stage, wherein the driving transistor further comprises a second control terminal, the first control terminal of the driving transistor and an active layer of the driving transistor are constituted as a first stray capacitance, and the second control terminal is coupled to a direct current (DC) signal terminal, so that the second control terminal of the driving transistor and the active layer are constituted as a second stray capacitance.

9. The display panel according to claim 8, wherein the voltage stabilization sub-circuit comprises:

a voltage stabilization transistor, wherein a control terminal of the voltage stabilization transistor is coupled to a first scanning line, and an input and an output of the voltage stabilization transistor are coupled to the driving voltage terminal and the first control terminal of the driving transistor respectively, so that the first control terminal of the driving transistor is coupled to the driving voltage terminal.

10. The display panel according to claim 8, wherein the pixel driving circuit further comprises:

a storage capacitor, wherein one end of the storage capacitor is coupled to the first control terminal of the driving transistor, and the other end of the storage capacitor is coupled to the output of the driving transistor.

11. The display panel according to claim 10, wherein the pixel driving circuit further comprises a reset sub-circuit configured to pull down a voltage at one end of the storage capacitor coupled to the sub-pixel to a reset voltage, in response to a response-to-reset voltage output by a response-to-reset voltage line.

12. The display panel according to claim 11, wherein the reset sub-circuit comprises a reset transistor, a control terminal of the reset transistor is coupled to the response-to-reset voltage line, and an input and an output of the reset transistor are coupled between the output of the driving transistor and a reset voltage terminal.

13. The display panel according to claim 8, wherein the data-writing sub-circuit comprises:

a first-data-write-control transistor, wherein a control terminal of the first-data-write-control transistor is coupled to a second scanning line, and an input and an output of the first-data-write-control transistor are coupled to the data voltage terminal and the input of the driving transistor, respectively; and a second-data-write-control transistor, wherein a control terminal of the second-data-write-control transistor is coupled to the second scanning line, an input of the second-data-write-control transistor is coupled to a first control terminal of the driving transistor, and an output of the second-data-write-control transistor is coupled to the output of the driving transistor; in a writing process of the data voltage, the data voltage is written to the first control terminal of the driving transistor through the first-data-write-control transistor, the driving transistor and the second-data-write-control transistor.

14. The display panel according to claim 8, wherein the pixel driving circuit further comprises:

a first-input-control transistor, wherein a control terminal of the first-input-control transistor is coupled to an emission-signal line, and an input and an output of the first-input-control transistor are coupled to the driving voltage terminal and the input of the driving transistor respectively, so that the input of the driving transistor is coupled to the driving voltage terminal; and a second-input-control transistor, wherein a control terminal of the second-input-control transistor is coupled to the emission-signal line, and an input and an output of the second-input-control transistor are coupled to the sub-pixel and the output of the driving transistor respectively, so that the output of the driving transistor is coupled to the sub-pixel.

15. A display device, comprising a display panel, the display panel comprises a plurality of pixels, each of the plurality of pixels comprises a plurality of sub-pixels, and each of the plurality of sub-pixels is coupled to one pixel driving circuit applied to a display panel comprising a plurality of pixels; the pixel driving circuit comprises:

a driving sub-circuit which comprises a driving transistor, wherein an input of the driving transistor is coupled to a driving voltage terminal, and an output of the driving transistor is coupled to a sub-pixel;

a data-writing sub-circuit, wherein an output of the data-writing sub-circuit is coupled between the input of the driving transistor and the driving voltage terminal, and the data-writing sub-circuit is configured to write a data voltage to the driving transistor in a compensation and writing stage; and a voltage stabilization transistor coupled to a control terminal of the driving transistor and configured to keep a voltage at the first control terminal of the driving transistor to be stable in a reset stage, wherein the driving transistor further comprises a second control terminal, the first control terminal of the driving transistor and an active layer of the driving transistor are constituted as a first stray capacitance, and the second control terminal is coupled to a direct current (DC) signal terminal, so that the second control terminal of the driving transistor and the active layer are constituted as a second stray capacitance.

* * * * *